No. 754,729. PATENTED MAR. 15, 1904.
J. K. WHITE.
GRAIN SEPARATOR.
APPLICATION FILED MAY 14, 1903.
NO MODEL.
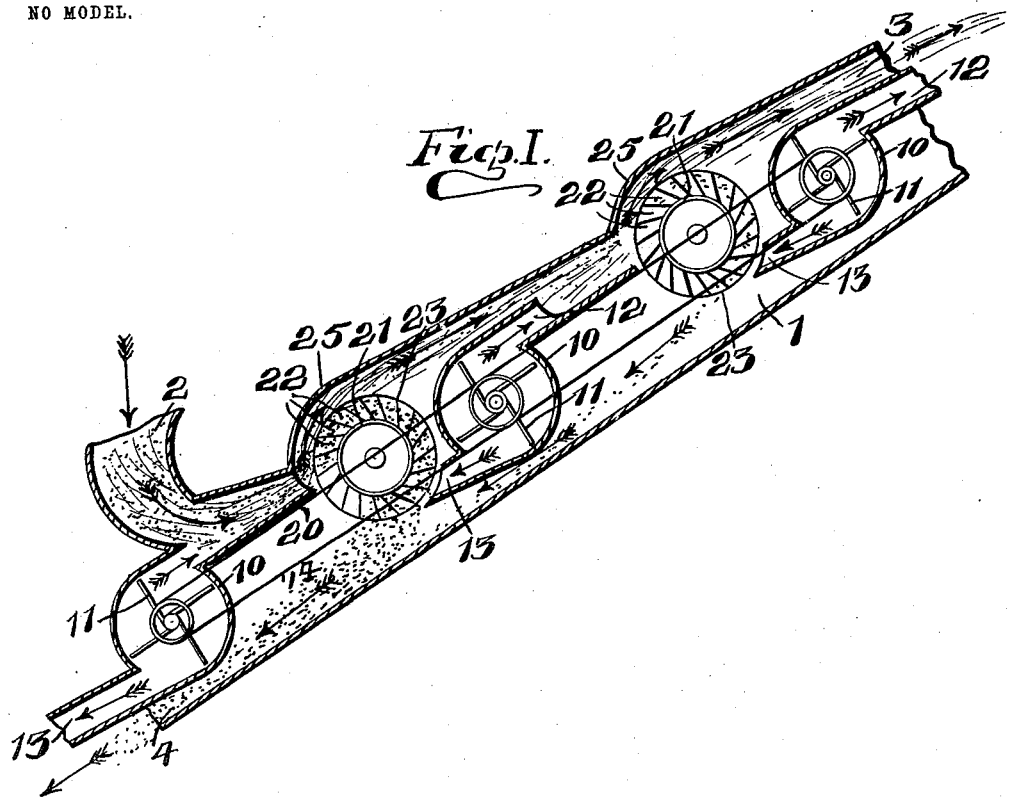
Fig. I.
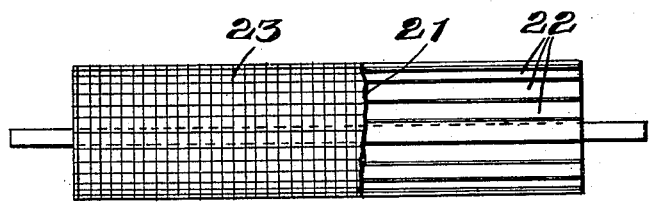
Fig. II.
Witnesses: Inventor:
Berlin G. Braun James K. White,
S. R. Brattan by Collamer & Co., Attorneys.

No. 754,729. Patented March 15, 1904.

UNITED STATES PATENT OFFICE.

JAMES K. WHITE, OF MANSFIELD, OHIO.

GRAIN-SEPARATOR.

SPECIFICATION forming part of Letters Patent No. 754,729, dated March 15, 1904.

Application filed May 14, 1903. Serial No. 157,078. (No model.)

*To all whom it may concern:*

Be it known that I, JAMES K. WHITE, a citizen of the United States, and a resident of Mansfield, Richland county, State of Ohio, have invented certain new and useful Improvements in Grain-Separators; and my preferred manner of carrying out the invention is set forth in the following full, clear, and exact description, terminating with claims particularly specifying the novelty.

This invention relates to threshing - machines, and more especially to the separators used for removing the grain and chaff from the straw after the threshing operation has taken place; and the object of the same is to improve the construction of a separator of this type.

To this end the invention consists in a separator having an upwardly - inclined body through which the material is fed by means of one or more double fans, the upper mouth of each fan driving the material outward along the upper passage and the lower mouth driving the grain and chaff backward along the lower passage; and the invention also contemplates the employment of one or more idler separating-cylinders which are driven by the air-blasts alone. The details are set forth in this specification and illustrated in the accompanying drawings, in which—
Figure I is a diagrammatic longitudinal sectional view. Fig. II is a plan view showing one of the idler-cylinders with part of its screen-covering removed.

Referring to the drawings, the numeral 1 designates a casing which preferably stands inclined upward at an angle of about forty-five degrees, as shown in Fig. I. The latter being a diagrammatical or theoretical view, it is not considered necessary to show supports for it or to give the details further than as set forth below. Furthermore, it is understood that the straw, grain, and chaff from the threshing-machine are fed into this casing at the point 2, and of course the straw passes outward at the exit 3, while the grain and chaff are returned and delivered at the point 4 for further separation, if necessary, in a manner which will be clear.

Located at suitable points within the casing are a number of drums 10, containing rotary fans 11 of the usual well-known type, which draw the air in at their ends and deliver it at a mouth or mouths. In the present instance I have shown three such fans, although there may be one or a series, preferably a series, and each fan has an upper mouth 12 and a lower mouth 13. These fans are driven by any suitable mechanism which will cause them to rotate in unison. In the present instance I have indicated a belting 14 connecting them; but it is clear that they might be driven by gearing or otherwise.

Coming now to the present invention, the inlet 2 feeds the material into what I will call an "upper" passage, which is divided from the remaining portion of the casing by a longitudinal partition 20. Between each two fans is located an idler-cylinder 21, mounted in suitable bearings and having buckets 22, which are preferably inclined about as shown in Fig. I and provided with closed bottoms. Surrounding this cylinder and covering the outer ends of the buckets may be a screen 23, and the meshes of the screens of different cylinders may vary in size. The upper passage leads to and over the first bucket, thence outward over the adjacent fan and to and over the next bucket, and so on. The lower sides of these cylinders are adapted to deliver into the lower passage, which is that portion of the casing beneath the partitions, the fans, and the cylinders. The upper passage leads, preferably diametrically, toward each cylinder and thence curves upward over it, as 25.

In operation the power drives the several fans at a high rate of speed, and the air-blast issuing from their upper mouths 12 is led outward along the upper passage and strikes the buckets of the cylinders, which are rotated solely thereby. The air-blast issuing from the lower mouths 13 is led inward along the lower portion of the casing and strikes the lower sides of the buckets, as will be seen. There is thus created an outward current of air along the upper passage which sucks in the straw, grain, and chaff, and an inward draft of air along the lower passage. The material strikes the screens with great force and the finer particles pass through the cylinder-screens 23 into the buckets, while the coarser particles pass on. If the size of mesh of the different screens is graduated properly, separation will take place in a manner which will be obvious, and the straw will be blown out on the exit 3. The finer portions make half a revolution within the idler-cylinder, drop out at the bottom, and are blown back and delivered at the point 4. It is not necessary to go more into the details of the operation of the device than to relate that the salient points are that the idler-cylinders are driven by air-blast only, that the same air draws in the material to be separated, blows out the coarser particles, and blows back the finer particles, and that the provision of a number of cylinders, with their rotary screens, (all graduated in size of mesh), will be found to produce almost perfect separation.

What is claimed as new is—

1. In a grain-separator, the combination with an idler-cylinder having buckets, and a surrounding screen; of a casing having a passage leading to and over said cylinder outward, and a second passage leading beneath said cylinder inward, and means for directing an air-blast along the upper passage.

2. In a grain-separator, the combination with a cylinder having buckets, and a surrounding screen; of a casing having a passage leading diametrically toward and thence curving upward over said cylinder outward, a partition within the casing beneath this passage, and a lower passage leading along within the casing beneath the cylinder inward, and means for directing air-blasts outward along the upper passage and inward along the lower passage.

3. In a grain-separator, the combination with an upwardly-inclined casing having a passage leading outward along its top and another passage leading inward along its bottom; of a series of separating-cylinders journaled within the casing between said passages, partitions dividing the latter from each other, buckets within the cylinders, screens surrounding them and of different mesh on different cylinders, and means for directing an air-blast outward along the upper passage and inward along the lower passage.

4. In a grain-separator, the combination with an upwardly-inclined casing having a passage leading outward along its top and another passage leading inward along its bottom; of a series of separating-cylinders journaled within the casing between said passages, partitions dividing the latter from each other, buckets within the cylinders, screens surrounding them and of different mesh on different cylinders, and means for directing an air-blast outward along the upper passage and inward along the lower passage, said cylinders being rotated by said air-blasts only.

5. In a grain-separator, the combination with an upwardly-inclined casing having a passage leading outward along its top and another passage leading inward along its bottom; of a series of separating-cylinders journaled within the casing between said passages, partitions dividing the latter from each other, buckets within the cylinders, screens surrounding them and of different mesh on different cylinders, means for directing an air-blast outward along the upper passage and inward along the lower passage; and a series of rotary fans located within the casing between the cylinders each having an upper mouth directing an air-blast outward along the upper passage and a lower mouth directing an air-blast inward along the lower passage.

6. In a grain-separator, the combination with a casing having a passage leading along its top and another passage leading along its bottom; of a series of separating-cylinders journaled within the casing between said passages, buckets within the cylinders, screens surrounding them, a series of fans journaled in the casing between the cylinders, each having an upper mouth directing a blast of air outward along the upper passage and a lower mouth directing a blast of air inward along the lower passage, and means for rotating these fans in unison, the cylinders being driven by the air-blasts only.

7. In a grain-separator, the combination with a cylinder having buckets provided with closed inner ends, and surrounding screen, of a casing having a passage leading to and over said cylinder outward, a second passage leading beneath said cylinder inward, and means for directing an air-blast along the outer passage.

In testimony whereof I have hereunto subscribed my signature this the 11th day of May, A. D. 1903.

JAMES K. WHITE.

Witnesses:
GEORGE MOORHOUSE,
MINNIE HULL.